United States Patent
Domino et al.

(10) Patent No.: US 6,259,752 B1
(45) Date of Patent: Jul. 10, 2001

(54) SYSTEM FOR CANCELLING INTERNAL INTERFERENCE IN A RECEIVER

(75) Inventors: William J. Domino, Yorba Linda; Morten Damgaard, Laguna Hills; Darioush Agahi-Kesheh, Irvine, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/495,993

(22) Filed: Feb. 1, 2000

(51) Int. Cl.$^7$ ............................................. H03D 1/04
(52) U.S. Cl. ........................ 375/346; 455/283; 455/277
(58) Field of Search ........................... 375/346; 455/283, 455/232.1, 277

(56) References Cited

U.S. PATENT DOCUMENTS

| | | | |
|---|---|---|---|
| 4,633,519 | * 12/1986 | Gotoh et al. | 455/277 |
| 5,361,404 | * 11/1994 | Dent | 455/135 |
| 5,422,889 | * 6/1995 | Sevenhans et al. | 370/95.3 |
| 5,448,770 | * 9/1995 | Hietala et al. | 455/126 |
| 5,469,465 | * 11/1995 | Brichler et al. | 375/346 |
| 5,579,347 | * 11/1996 | Lindquist et al. | 375/346 |
| 5,689,502 | * 11/1997 | Scott | 370/281 |
| 5,890,068 | * 3/1999 | Fattouche et al. | 455/456 |
| 6,018,651 | * 1/2000 | Bruckert et al. | 455/277.1 |

* cited by examiner

Primary Examiner—Stephen Chin
Assistant Examiner—Tony Al-Beshrawi
(74) Attorney, Agent, or Firm—Welsh & Katz, Ltd.

(57) ABSTRACT

A system for reducing internal interference in a radio-frequency (RF) receiver includes providing a plurality of time slots within a frame where the receiver is configured to receive external RF signals during a receive time slot within the frame. External RF signals are the prevented from reaching a front-end portion of the receiver and the receiver is activated, and a predetermined period of time is permitted to elapse to permit the receiver to settle. An interference data collection is performed during a period of time prior to a predetermined receive time slot where the data collected represents internally generated interference signals. The data collected during the interference data collection is processed to determine a bias value corresponding to the interference signals, and the receiver is then permitted to receive external RF signals during the predetermined receive time slot so that data is collected during the predetermined receive time slot. The data collected during the predetermined receive time slot is processed and the bias value is subtracted from the data collected to provide output data corresponding to the external RF signals absent the interference signals.

21 Claims, 3 Drawing Sheets

SYSTEM FOR CANCELLING INTERNAL INTERFERENCE IN A RECEIVER

BACKGROUND OF THE INVENTION

The present invention relates generally to a system for canceling interference in a receiver, and more specifically, to a system for canceling internal interference in a time-division multiple access (TDMA) receiver, such as in a GSM receiver (Global System For Mobile Receiver).

GSM receivers typically derive many different clock frequencies from a single reference frequency, and are susceptible to "self-jamming" or interference at particular frequency channels. For example, it is common to use crystal oscillator as a system clock operating at a frequency of either 13 MHz or 19.5 MHz because use of such frequencies permits other clock frequencies to be easily derived. A problem arises when a harmonic of the system clock is the same frequency as one of the GSM communication channels. For example, the $72^{nd}$ harmonic of a 13 MHz system clock has energy at 936 MHz (72*13=936). Channel 5 of the GSM system happens to be centered at 936 MHz. Thus, the harmonics produced by the system clock causes interference with GSM channel No. 5. Further, additional interference is caused by other harmonics, which may not necessarily be generated by the system clock, but rather, by other clocks in the system and by spurious mixes of local oscillators. In heterodyne or super-heterodyne receivers, local oscillators, mixers, and various digital clocks emit a wide range of harmonics that interfere with various GSM channels.

One approach to solve this problem in prior art systems is to add shielding to the "noisy" components of the system so that the harmonic energy does not substantially escape or enter the receiver circuitry. This involves using various metal enclosures and screens, and may include specialized printed circuit board design. This, however, adds significant weight and increases the size of the device. Because weight and size are extremely important considerations in the design of a GSM system, such as a cellular telephone, the disadvantages of this approach are apparent. Further, use of shielding increases the cost of the device, which is usually sold in a cost-competitive market.

SUMMARY

Reduction of internal interference in a radio-frequency (RF) receiver may be accomplished by providing a plurality of time slots within a frame where the receiver is configured to receive external RF signals during a predetermined receive time slot within the frame. External RF signals may be prevented from reaching a front-end portion of the receiver just prior to the receive time slot, the receiver is then activated, and a predetermined period of time is allowed to elapse, thus permitting the receiver to settle and become stable. An interference data collection is performed during a period of time prior to the predetermined receive time slot where the data collected represents internally generated interference signals. The data collected during the interference data collection is processed to determine a bias value corresponding to the interference signals, and the receiver is then permitted to receive the external RF signals during the predetermined receive time slot so that data is collected during the predetermined receive time slot. The data collected during the predetermined receive time slot is processed and the bias value is subtracted therefrom to provide output data corresponding to the external RF signals absent the interference signals.

BRIEF DESCRIPTION OF THE DRAWINGS

The features of the present invention that are believed to be novel are set forth with particularity in the appended claims. The invention may best be understood by reference to the following description in conjunction with the accompanying drawings.

DETAILED DESCRIPTION

Figure 1:
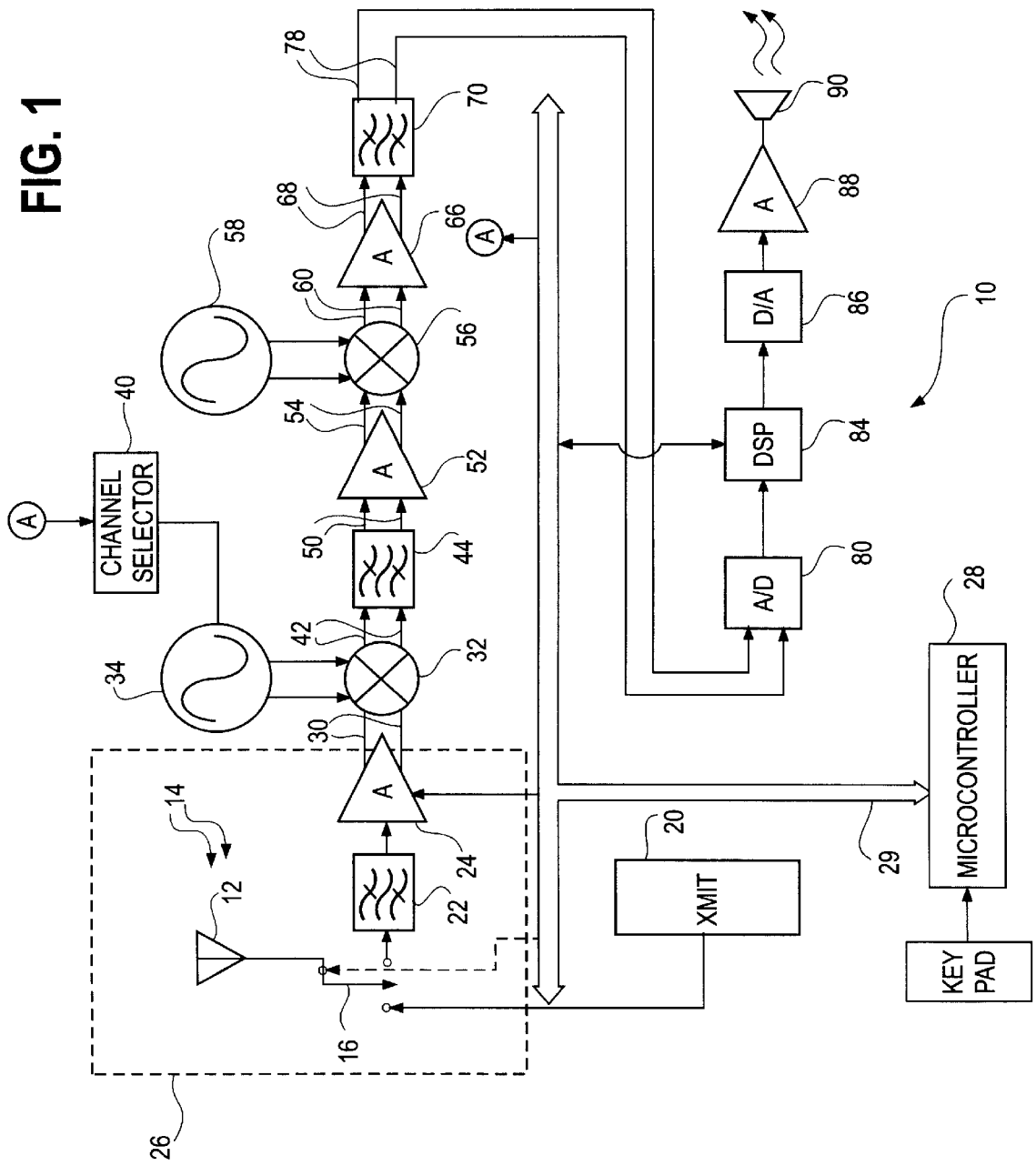
FIG. 1 is a schematic block diagram of a specific embodiment of according to the present invention.

Referring now to FIG. 1, a specific embodiment of a GSM receiver 10 for use in a GSM communication system is shown. Note that the present inventive system may be used in any TDMA type receiver, such as a GSM receiver, and is also applicable to IS136 type receiver systems, which also use a time division multiplexing scheme.

The GSM receiver 10 includes an antenna 12 for receiving GSM communication signals (radio frequency signals) 14. The antenna 12 is coupled to a switch 16, which is shown symbolically, for example, as a single-pole single-throw switch. The switch 16, however, may be for example, a FET (field effect transistor) switch or MOSFET (metal-oxide semiconductor FED) switch, or any suitable device capable of blocking or de-coupling a signal from its source. The switch 16 is used because the GSM receiver 10 utilizes a single antenna for receiving and transmitting, as will be described in greater detail hereinafter. The switch 16 couples the antenna 12 to a transmitter block 20 or to an RF bandpass filter 22, depending upon its position, such that the GSM receiver 10 can be placed in either a "receive" mode or a "transmit" mode at any particular time. The filter 22 is coupled via the switch 16 to the antenna 12 when the GSM receiver 10 is in the receive mode of operation. The transmitter block 20 is shown in block diagram representation only.

The filter 22 filters the air-based RF signals 14 or external signals received on the antenna 12 and passes only a band of frequencies occupied by specific communication channels used for the GSM communication system. The external signals 14 are typically the communication signals representing voice, data, or other information desired to be transmitted and/or received by a user. For example, the filter 22 may have a pass-band frequency of 935 MHz to 960 MHz, which may provide appropriate bandwidth for 125 individual GSM communication channels or more. The filter 22 substantially eliminates or reduces interfering signals at frequencies above and below the frequencies used for the 125 GSM communication channels.

The output of the filter 22 is then amplified by an amplifier 24, which may be, for example, a front-end low-noise amplifier. The antenna 12, filter 22, and amplifier 24 may be part of a "front-end" 26 of the receiver 10. Also included in the front-end 26, but not specifically shown in FIG. 1, may be one or more attenuators. The external RF signals 14 may be prevented from reaching the front-end 26 of the receiver 10 through several methods. First, the switch 16 may function as a signal blocking circuit. Specifically, under software control, the switch 16 may be set so that the antenna 12 is coupled to the transmitter block 20 rather than to filter 22 of the receiver 10. If the transmitter block 20 is turned off, the antenna 12 is effectively disconnected from the filter 22 and amplifier 24 such that the external RF signals 14 are prevented from reaching the front-end 26 of the receiver 10. Essentially, the switch 16 is switchably controllable under software control so that it may be placed in the blocking or non-blocking position.

Second, the amplifier 24 may also function as a signal blocking circuit. Again, under software control, the amplifier 24 may be shut down, as is known in the art, so that substantially no signals pass through it, thus effectively preventing the external RF signals 14 from reaching and/or passing through the front-end 26 of the receiver 10.

A micro-controller or other processor 28 is preferably included to control various components in the GSM receiver 10 and is coupled to the various components by a bus 29, as is known in the art. The bus 29 is shown pictorially but may also include individual control lines and is not meant to be limited only to byte-wide data. The processor 28, may be for example, a computer, processor, central processing unit (CPU), microprocessor, RISC (reduced instruction set computer), single chip computer, distributed processor, controller, micro-controller, discrete logic device, and the like.

The amplifier 24 produces an amplified signal on differential conductors 30, and is coupled to a main mixer 32, which then mixes the amplified signals 30 with an output of a differential oscillator 34. The differential oscillator 34, may be, for example, a voltage-controlled oscillator (VCO), but need not be a differential VCO.

A channel selector 40 provides a tuning signal to the VCO 34, which permits the VCO to produce an output at a frequency corresponding to a desired GSM communication channel. The channel selector 40 is controlled by the processor 28. Specifically in the illustrated embodiment, the GSM communication band may span twenty-five megahertz from 935 MHz to 960 MHz, which may include 125 GSM communication channels, each having a bandwidth of 200 KHz. To permit selection from among these GSM communication channels, the VCO 34 produces an output that is tunable in 200 KHz steps from 1335 MHz to 1360 MHz, such that the VCO can be tuned by the channel selector 40 to a frequency associated with any desired GSM channel of the 125 GSM communication channels. In this way, when the tuning signal output of the VCO 34 is mixed with the output of the amplifier 24 by the main mixer 32, a first mixed signal (IF signal) having a 200 KHz bandwidth is produced across a pair of differential output conductors 42 of the main mixer. The first mixed signal has a base frequency of 400 MHz (the difference between the frequency of the output of the VCO 34 and the frequency of the amplified signal on differential conductors 30) and contains the particular 200 KHz GSM communication channel selected by the channel selector 40.

The differential output of the main mixer 32 is routed to a first IF (intermediate frequency) filter 44, which passes only signals at IF. For example, the IF filter 44 may have a pass-band frequency of about 400 MHz and a bandwidth of about 200 KHz. The output of the IF filter 44 appears on differential conductors 50, which provides the IF signal to a second amplifier 52. The second amplifier 52 amplifies the IF signals to produce an amplified IF signal across a pair of differential conductors 54, which in turn, are coupled to an auxiliary mixer 56.

The auxiliary mixer 56 receives the IF signal and mixes it with a 385.4 MHz fixed-frequency signal produced by an auxiliary VCO 58, which may be, but need not necessarily be a differential VCO. The auxiliary mixer 56 further down-converts the amplified IF signal to a frequency of 14.6 MHz. The auxiliary mixer 56 produces further down-converted signals across a pair of differential output conductors 60, which in turn, are coupled to a third amplifier 66.

The third amplifier 66 amplifies the down-converted 14.6 MHz signal containing the selected GSM communication channel and passes it via a pair of differential output conductors 68 to a band-pass filter 70 having a substantially 200 KHz pass-band at 14.6 MHz. The filter 70 provides further suppression of unwanted frequencies and provides an output signal across a pair of differential output conductors 78, which is routed to an A/D converter 80, and is further processed by a digital-signal-processing (DSP) 84. The DSP 84 is also under processor 28 control, and data may be transferred between the DSP and the processor via the bus 29. As is known in the art, the DSP 84 samples the digital data at an appropriate sampling rate, for example, at a 19.5 MHz sample rate, and provides an output in the form of digital words, which are preferably sixteen bits in length. However, any suitable digital signal processor may be employed, which may use any suitable bit length format. After processing, the output of the DSP 84 is then converted back into analog form by a D/A converter 86, where it is then amplified by an output amplifier 88 and output to a speaker 90. As shown in the illustrated embodiment of FIG. 1, a super-heterodyne receiver is shown using two down-conversion stages. However, any suitable number of down-conversion stages may be used to provide appropriate tuning for the frequency range utilized.

Figure 2:
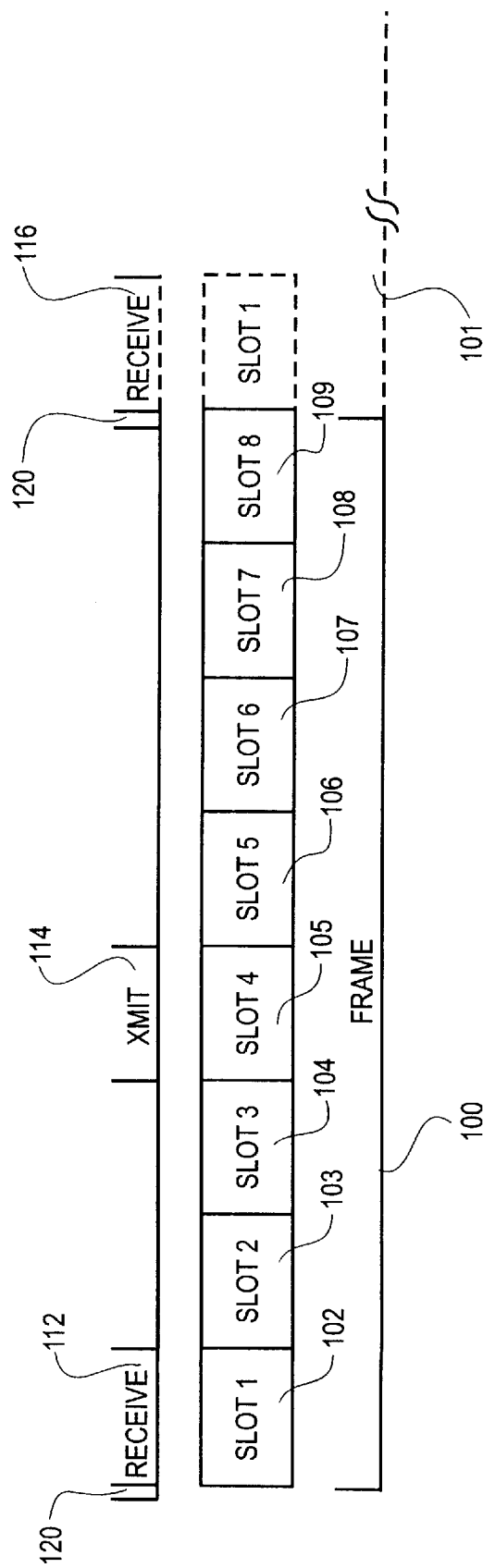
FIG. 2 is a pictorial representation of a specific embodiment of a time slot allocation scheme, according to the present invention.

Referring now to FIGS. 1 and 2, FIG. 2 illustrates a specific embodiment of a TDMA (time division, multiple access) timing scheme. Such timing schemes are applicable to receivers utilizing time-division multiple access formats. As shown in FIG. 2, a frame 100 is shown, which preferably includes, for example, eight individual slots 102–109 of substantially equal duration. The frame 100 may be about 4.615 milliseconds in duration while each slot 102–109 may be about 576.875 microseconds in duration. The frame 100 continuously repeats to provide a uniform format to which all member GSM communication systems conform. A portion of a subsequent frame is labeled as 101. However, the frames 100 and 101 may be of any suitable duration and may include any suitable number of time slots within, and is not limited to the specific embodiment illustrated.

As is known in the art, time division multiplexing schemes permit greater bandwidth because a user receives and transmits only during specific time intervals within the frame 100. Thus, multiple users can be accommodated with a single frame. No information is lost because data transmitted and received during a particular slot is compressed and expanded, respectively, thus the time slot allocation appears transparent to the user. Accordingly, multiple GSM systems can operate in the same area (using a common cellular base station, not shown) using the same receive frequency without conflict because each GSM communication system (cellular telephone) is assigned one of the eight slots 102–109 in which to receive, and one of the eight slots in which to transmit. Note that the transmission frequency is different than the receive frequency. This essentially multiplies by eight the number of users that can share a single RF channel of one common cellular base station, whether receiving or transmitting.

For any particular GSM communication system, the receiver 10 may receive RF signals 14 during a selected slot 102–109 within the frame 100. In the illustrated embodiment, for example, the receiver 10 is designated to receive data during slot 102 (time slot 1), which is shown as a "receive slot" 112 in FIG. 2. Similarly, the transmitter may transmit data during one selected slot 102–109 within the frame 100. In the illustrated embodiment, for example, the transmitter is designated to transmit during time slot 105 (time slot 4), which is shown as a "transmit slot" 114 in FIG. 2. The base station assigns and directs the slot allocation for each GSM communication device in communication with it. As described above, the frame format continuously repeats, and a receive time slot designated as 116 in dashed lines represents the next receive time slot in the subsequent frame 101. Preferably, the receiver 10 receives only during one specific time slot within the frame 100 and transmits only during one specific time slot within the frame. However, the receiver 10 may be configured to receive or transmit during more than one time slot within the frame 100, of course, with a corresponding reduction in bandwidth capacity.

The receiver 10 also performs an "interference data collection" during an interference time slot 120, which occurs prior to the receive time slot 112. Thus, the interference time slot 120 uses a portion of a time slot prior to the predetermined receive time slot, which is shown in the illustrated embodiment of FIG. 2 as slot 8 labeled as 109.

As described above, interference may be caused by harmonics generated by the main system clock or by other digital clocks in the system. In GSM systems that use digital signal processors (DSP), the interference caused by such harmonics is typically manifest as constant bias or digital value in the digital data processed by the DSP. This results in bit errors that cause distortion and other undesirable effects. To reduce the undesirable effects caused by the internally generated interference, the present invention essentially isolates, measures, and "subtracts" out the components attributable to such interference such that the final output eliminates substantially all of the signals caused by the internally generated interference. This is based on the premise that once the receiver 10 has been tuned to a particular frequency and allowed to settle, any interference internally generated will remain relatively constant, at least within the time period defined by the frame 100. It is also assumed that the interference signals will then be present during the time slot when user data is received during the predetermined receive time slot 112. The interference signals can be collected, processed, and quantified, just like any other data. Once the interference signals have been isolated and quantified in the digital domain, they can be subtracted from the user data received to substantially eliminate the interference signals.

Although the receive time slot 112 is often referred to herein as the "predetermined" or "specific" receive time slot, it may not occupy the same relative position within the frame 100 at all times. Further, the base station directs and specifies to the receiver 10 on an on-going basis which time slots within the frame 100 should be allocated to receiving and transmitting, respectively. This may vary from frame to frame, or may be constant for a large number of frames.

Figure 3:
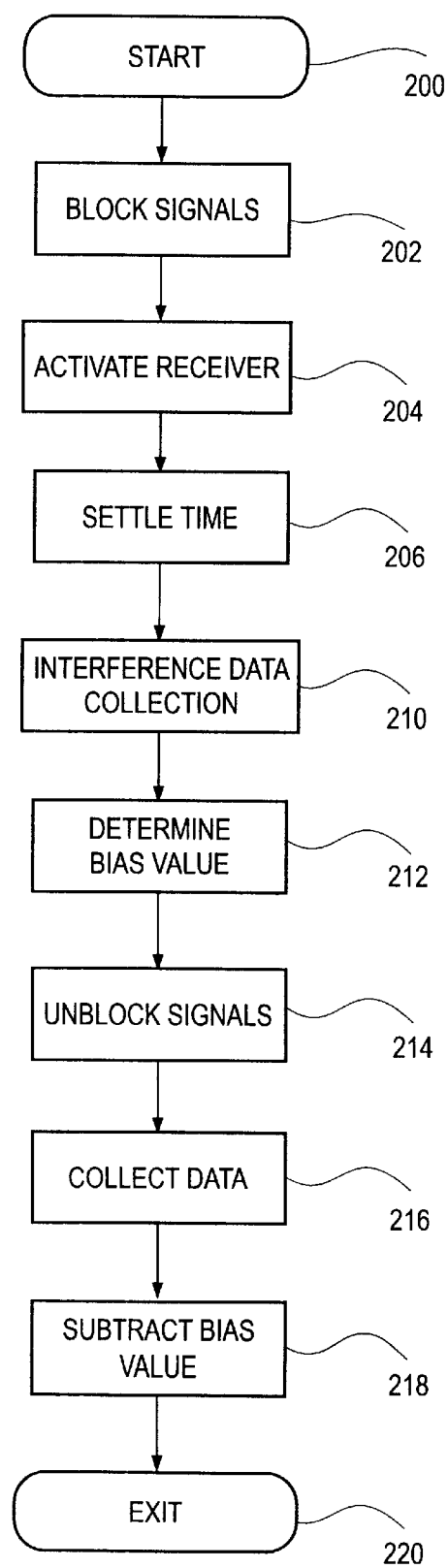
FIG. 3 is a flowchart of a specific embodiment of the method of the present invention.

Referring now to FIGS. 1–3, FIG. 3 depicts a flowchart of the operation of the present invention. Processing via the DSP 84 begins at a block 200, and at a block 202, the external RF signals 14 are prevented from reaching the front-end portion 26 of the receiver. The switch 16 is under processor 28 control and when opened, substantially prevents the external RF signals 14 from reaching the front-end components 26 of the receiver 10, as described above. By opening the switch 16, such external RF signals 14 are attenuated by about 20 dB such that the signals are negligible. Essentially, the external RF signals 14 are not passed through the filter 22 to the amplifier 24. Alternately, the amplifier 24 can be turned off to prevent the external RF signals 14 from passing through the front-end 26 of the receiver 10. Whether the switch 16 is toggled to an "off" position or the amplifier 24 is turned off, the RF signals are substantially prevented from reaching or passing through the front-end 26.

Next, the receiver is activated, as shown in a block 204 and the system is allowed to settle for about 10 microseconds, as shown in a block 206. Settling time is required so that the VCOs 34 and 58 reach a stable oscillation frequency. The settling time, however, may vary widely depending upon the components selected, thus settling time may vary from about between 5 microseconds to 150 microseconds. Activation of the receiver 10 includes performing the necessary tuning functions to tune the receiver 10 a particular channel such that the appropriate down-conversion step is performed. Briefly, the channel selector 40 selects the appropriate channel to tune the VCO 32 to accomplish the first stage down-conversion. The receiver 10 is activated prior to the receive time slot 112 and is preferably de-activated during the remainder of the frame 100 to conserve battery life, as is known in the art. Note that in the illustrated embodiment the step of blocking the RF signals (block 202) is shown to occur prior to the step of activating the receiver (block 204), which is shown to occur prior to the step of waiting for the receiver to settle (block 206). However, the order of these steps need not necessarily be performed in the exact order shown. For example, the receiver 10 may be activated (block 204) and/or allowed to settle (block 206) before the signals are blocked (block 202). However, the receiver circuitry is preferably activated as late as possible and for as short of a duration as possible to minimize power draw and maximize battery life. The only requirement is that the external RF signals 14 must be blocked at the time that the interference data collection is performed.

After the receiver 10 has settled, the interference data is ready to be collected. As shown in the timing diagram of FIG. 2, interference data is initially collected during a period of time 120 prior to the predetermined receive time slot 112, as shown in a block 210 of FIG. 3. This period of time is referred to as the interference time slot 120, which preferably, is substantially shorter in duration than the receive time slot 112. The predetermined receive time slot in the illustrated embodiment are shown as reference numeral 112 in frame 100 and frame 101, where frame 101 is the subsequent frame. This cycle repeats endlessly. Preferably, the interference time slot 120 is immediately adjacent the predetermined receive time slot 112. However, the interference time slot 120 may be positioned at any time prior to the predetermined receive time slot 112, limited only by the duration of the frame 100. Accordingly, the interference time slot 120 may occur up to about 4.6 milliseconds before the beginning of the predetermined time slot 112, which is the duration of the frame 100. This means that the interference time slot could occur just after the end of the previous receive time slot. Preferably, the interference data is collected as close in time as possible to the receive time slot 112 so that interference conditions and parameters do not significantly change by the time data is collected during receive time slot.

Preferably, data is collected during the interference time slot 120 for a duration of about 100 microseconds. However, data may be collected during the interference time slot 120 for about between 20 to 200 microseconds. Preferably, the duration of the interference data collection represents about seventeen percent of the duration of the predetermined time slot 112, but may range from about between 3.5% to 35% of the duration of the predetermined time slot. The data collected during the interference time slot 120 represents internally generated interference signals, most likely caused by harmonics due to the system clock and other clocks in the system, and by spurious mixes of local oscillators, as described previously.

Next, the data collected during the interference time slot 120 is processed by the digital signal processor 84, and a bias value corresponding to the interference signals is generated, as shown in a block 212. The DSP 84 also saves the bias value in memory to generate a "running average" of the bias values for each GSM frequency tuned to. Some "smoothing" may also be performed, such as eliminating extremely high bias values such that the running average does not change abruptly. The running average may be used to determine if a calculated bias value is erroneous, and thus should be discarded, which may occur in the unusual situation where, for example, the receiver 10 is subjected to external interference of unusually high power at the frequency of interest.

The switch 16 is then closed to permit the receiver 10 to the receive external RF signals 14 during the predetermined receive time slot 112, and the data is collected during this predetermined receive time slot, as shown in a block 216. The data collected during the predetermined receive time slot 112 is then processed by the DSP 84 by subtracting the calculated bias value therefrom to provide output data corresponding to the external RF signals 14 absent the interference signals, as shown in a block 218. The program then exits, as shown in a block 220. Again, note that the exact order of the steps of determining the bias value (block 212), unblocking the external RF signals (block 214), and collecting data (block 216) need not be performed in the exact order shown in the illustrated embodiment. For example, data may be collected, as shown in the block 216, and then the bias value may then be calculated such that the bias value is available for further processing in the block 218. Also, the bias value may be determined (block 212) after the external RF signals 14 are unblocked (block 214).

Specific embodiments of a system for cancelling internal interference in a receiver according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed.

What is claimed is:

1. A method for reducing internal interference in a radio-frequency (RF) receiver configured to receive external RF signals during a predetermined receive time slot within a frame, the method comprising:

preventing the external RF signals from reaching a front-end portion of the receiver;

activating the receiver;

performing an interference data collection to collect data during a period of time prior to the predetermined receive time slot, the data collected representing internally generated interference signals;

determining a bias value corresponding to the interference signals;

permitting the receiver to receive the external RF signals during the predetermined receive time slot and collecting data during such predetermined receive time slot; and processing the data collected during the predetermined receive time slot and subtracting the bias value therefrom to provide output data corresponding to the external RF signals absent the interference signals.

2. The method according to claim 1 wherein a switch is configured to substantially prevent the external RF signals from reaching the front-end of the receiver.

3. The method according to claim 1 wherein at least one of a front-end component is turned off to substantially prevent the external RF signals from passing through the front-end of the receiver, the at least one front-end component is selected from the group consisting of a filter, amplifier, and attenuator.

4. The method according to claim 1 including the step of waiting for between five microseconds and one-hundred and fifty microseconds for the receiver to settle.

5. The method according to claim 1 wherein the interference data collection is substantially immediately adjacent the predetermined receive time slot.

6. The method according to claim 1 wherein the interference data collection occurs within four milliseconds before the beginning of the predetermined time slot.

7. The method according to claim 1 wherein the interference data collection has a duration of between twenty to two-hundred microseconds.

8. The method according to claim 1 wherein the interference data collection occurs between two successive predetermined receive time slots.

9. The method according to claim 1 wherein interference data collection is 3.5 percent to thirty-five percent of the duration of the predetermined time slot.

10. The method according to claim 1 wherein a digital signal processor processes the data collected during the interference data collection and generates a digital bias value corresponding to the interference signals received.

11. The method according to claim 10 wherein the data collected during the predetermined receive time slot includes data corresponding to the interference signals, and the step of processing includes subtracting the digital bias value corresponding to the interference signals from digital values corresponding to data collected during the predetermined receive time slot.

12. The method according to claim 1 wherein the RF receiver is a time-division multiple-access receiver.

13. The method according to claim 1 wherein the step of activating the receiver includes tuning the receiver to a predetermined RF frequency such that an appropriate down-conversion is performed utilizing at least one of a VCO, mixer, and amplifier.

14. The method according to claim 1 wherein the receiver is permitted to settle for a predetermined period of time prior to performing the interference data collection.

15. A radio-frequency (RF) receiver apparatus configured to receive external RF signals during a predetermined receive time slot within a frame, and having internal interference reduction, the receiver comprising:

signal blocking circuit configured to switchably unblock or block the external RF signals;

at least one down-converting circuit to down-convert the external RF signals to lower frequency signals;

a digital signal processor configured to process the lower frequency signals; and the signal processor configured to perform an interference data collection to collect interference data during an period of time prior to the predetermined receive time slot, the interference data being received while the signal blocking circuit substantially prevents the external RF signals from reaching a front-end of the receiver, the interference data representing internally generated interference signals, the signal processor providing a bias value corresponding to the interference signals; and the digital signal processor configured to process the data received during the predetermined receive time slot, the data being received while the signal blocking circuit permits the external RF signals to reach the front-end of the processor, the signal processor subtracting the bias value from the value of data received during the predetermined receive time slot to provide output data representing the external RF signals absent the interference signals.

16. The apparatus according to claim 15 including a switch configured to substantially block and unblock the external RF signals from reaching the front-end of the receiver, the front-end of the receiver including front-end components selected from the group consisting of a filter, amplifier, and attenuator.

17. The apparatus according to claim 16 wherein at least one of the front-end components is turned off for a predetermined period of time to substantially prevent the external RF signals from passing through the front-end of the receiver.

18. The apparatus according to claim 15 wherein the interference data collection occurs within 4.6 milliseconds before the beginning of the predetermined time slot and has a duration of between twenty and two-hundred microseconds.

19. The apparatus according to claim 15 wherein the data collected during the predetermined receive time slot includes data corresponding to the interference signals, the signal processor subtracting a digital value corresponding to the interference signals from digital values generated corresponding to the data collected during the predetermined receive time slot, to provide output data corresponding to the external RF signals absent the interference signals.

20. The apparatus according to claim 15 wherein the RF receiver is a time-division multiple-access receiver.

21. A radio-frequency (RF) receiver configured to receive external RF signals during a predetermined receive time slot within a frame, and having internal interference reduction, the receiver comprising:

signal blocking means configured to block the external RF signals from reaching a front-end portion of the receiver;

at least one down-converting circuit to down-convert the external RF signals to lower frequency signals;

signal processing means for processing the lower frequency signals;

the signal processing means configured to perform an interference data collection to collect interference data during an period of time prior to a predetermined receive time slot, the data being received while the signal blocking means prevents the external RF signals from reaching the front end, the data processed representing internally generated interference signals, the signal processor providing a bias value corresponding to the interference signals; and the signal processing means configured to process data received during the predetermined receive time slot during, the data being received while the signal blocking means permits the external RF signals to reach the front end, the signal processing means subtracting the bias value from the value of data received during the predetermined receive time slot to provide output data representing the external RF signals absent the interference signals.

* * * * *